US006289728B1

(12) United States Patent
Wilkins

(10) Patent No.: US 6,289,728 B1
(45) Date of Patent: Sep. 18, 2001

(54) APPARATUS AND METHOD FOR DETERMINING THE AMOUNT OF LIQUID CONTAINED IN A STORAGE TANK

(75) Inventor: Larry C. Wilkins, Georgetown, IN (US)

(73) Assignee: Electromechanical Research Laboratories, Inc., New Albany, IN (US)

( * ) Notice: Subject to any disclaimer, the term of this patent is extended or adjusted under 35 U.S.C. 154(b) by 0 days.

(21) Appl. No.: 09/340,849

(22) Filed: Jun. 28, 1999

(51) Int. Cl.$^7$ .................................................... G01F 17/00
(52) U.S. Cl. .......................... 73/149; 73/314; 73/319; 73/322; 73/313
(58) Field of Search .......................... 73/149, 314, 319, 73/320, 322, 313, 312

(56) References Cited

U.S. PATENT DOCUMENTS

| | | | |
|---|---|---|---|
| 3,997,744 | 12/1976 | Higo | 200/84 |
| 4,114,430 | * 9/1978 | Luepertz et al. | 73/149 |
| 4,192,187 | 3/1980 | Kennedy et al. | 73/321 |
| 4,215,574 | 8/1980 | Godeux | 73/314 |
| 4,425,796 | 1/1984 | Boucher et al. | 73/312 |
| 4,454,759 | 6/1984 | Pirkle | 73/299 |
| 4,637,254 | * 1/1987 | Dyben et al. | 73/314 |
| 4,724,705 | 2/1988 | Harris | 73/313 |
| 4,779,460 | 10/1988 | Cruickshank | 73/313 |
| 4,852,404 | 8/1989 | Catanese | 73/319 |
| 5,076,101 | 12/1991 | Lazure | 73/290 |
| 5,127,266 | 7/1992 | Maresca et al. | 73/290 |
| 5,267,475 | 12/1993 | Gaston | 73/319 |
| 5,319,973 | 6/1994 | Crayton et al. | 73/290 |
| 6,029,514 | * 2/2000 | Adam et al. | 73/149 |

FOREIGN PATENT DOCUMENTS

| | | | |
|---|---|---|---|
| 4243751 | * 9/1986 | (DE) | 73/149 |
| 215921 | * 9/1986 | (JP) | 73/149 |
| 264326 | * 10/1993 | (JP) | 73/313 |
| 307275 | 8/1971 | (RU) . | |

* cited by examiner

Primary Examiner—Hezron Williams
Assistant Examiner—Nashmiya Fayyaz
(74) Attorney, Agent, or Firm—Woodard, Emhardt, Naughton, Moriarty & McNett

(57) ABSTRACT

An apparatus and method for determining the amount of liquid contained in a railroad tank car, or any other liquid storage tank having an interior region defining a predetermined relationship between liquid level and volumetric content. A tube having a closed bottom end is disposed within the tank in a substantially vertical orientation with the closed end of the tube emersed in the liquid and the open end of the tube protruding from the top of tank. An elongate member having a longitudinal edge defining a varying profile corresponding to the predetermined relationship between liquid level and volumetric content is slidably received within the tube. A float is slidable vertically along the exterior of the tube and is magnetically coupled to the elongate member such that as the float rises or falls in response to a change in liquid level, the elongate member will be vertically displaced within the tube. A measuring device positioned proximate the open end of the tube measures the distance between the longitudinal edge of the elongate member and a reference plane aligned substantially parallel to the longitudinal axis of the elongate member, the distance being directly proportional to the volumetric content of liquid contained in the tank. The measurement signal generated by the measuring device is proportionately converted into a standard volumetric unit of measurement by way of a signal multiplier. The volume of liquid contained in the tank may then be indicated on a remote display.

24 Claims, 6 Drawing Sheets

APPARATUS AND METHOD FOR DETERMINING THE AMOUNT OF LIQUID CONTAINED IN A STORAGE TANK

BACKGROUND OF THE INVENTION

1. Field of the Invention

This invention relates generally to a liquid storage tank, and more particularly to an apparatus and method for accurately determining the amount of liquid contained in the tank.

2. Description of the Prior Art

Liquid storage tanks are used to contain various substances in a wide range of applications. It is usually of interest, and often a necessity, to determine the level of liquid in a storage tank. In applications where knowledge of the precise quantity of liquid is critical, an indication of volumetric content is required. Applications involving the storage of dangerous substances, such as Benzene, typically require an enclosed tank completely sealed off from the outer environment. In these instances, measuring the level/volume of liquid in the tank must usually be done external to the tank. Additionally, some applications require an indication of the amount of liquid contained in the storage tank at a location remote from the tank.

Many sensing or monitoring approaches have been developed for determining liquid level. In some cases, rudimentary means are sufficient to determine liquid level, such as a sight glass connected to or incorporated into a side wall of the storage tank. In other cases where access to the side of the tank is impossible, inconvenient or impractical, a measuring rod may be inserted through an opening in the top of the tank to manually measure the liquid level. One end of the rod is initially placed in abutment against the bottom of the tank and the rod is then withdrawn. The level of liquid in the tank is determined by simply observing how much of the rod is wetted. In a more refined approach, a tube is mounted in the tank in a substantially vertical orientation. A float encircles the outer wall of the tube and is magnetically coupled to one end of a measurement rod. As the liquid level rises, the float carries the rod upwardly, whereby the level of liquid in the tank is indicated by the length of rod protruding from the upper end of the tube. Typically, the rod is graduated, having indicia imprinted on the outer surface of the rod which signify the amount of liquid contained in the tank.

Recently, even more refined and elaborate approaches have been developed to monitor liquid level. For instance, ultrasonic pulse-echo ranging systems have been used to determine the level of liquids and solids in tanks and other containers. However, a problem encountered when using such equipment is that the speed of sound varies markedly, both with temperature and according to the composition of the atmosphere between the ultrasonic transducer and the liquid level being measured. Furthermore, the high electrical voltages required to energize the transducer can pose significant problems in meeting safety requirements, especially where highly flammable vapors are contained in the tank.

Another method which has commonly been used to measure liquid level is dielectric variation sensing or capacitive liquid level sensing. This method is primarily used in conjunction with relatively non-conductive liquids. The non-conductive liquid plays the role of a dielectric material disposed between multiple electrodes which are used and are electrically connected as plates of a capacitor. The capacitance changes continuously as the vertical height of the liquid in the tank rises or falls. However, a problem with this approach is that it is often necessary to compensate for changes in the characteristics of the liquid being measured. Accordingly, because of the elaborate nature of the ultrasonic and dielectric methods of measuring liquid level, utilization of these methods is expensive and often requires a relatively high degree of maintenance.

As mentioned above, in certain applications involving the storage of dangerous substances, the interior of the storage tank must be sealed off from the outer environment. According to the nature of the liquid being monitored, which may be flammable, corrosive or have other undesirable properties, it may be necessary to isolate the liquid and/or its resulting vapors from the device used to measure the liquid level. Moreover, for measuring devices which require a relatively high degree of routine and periodic maintenance, it is often preferred, and sometimes absolutely required, that maintenance be conducted exterior to the storage tank. In many cases, it is both expensive and impractical to gain access to the interior of the storage tank, especially where the vapors given off by the liquid are noxious or poisonous.

In many liquid storage tank applications, mere knowledge of the level of liquid contained in the tank is insufficient since the volumetric content of liquid contained in the tank may not directly correspond to liquid level. Most methods currently used to determine the amount of liquid in a storage tank provide only a linear model of the "volume profile" (i.e., the internal dimensions of the storage tank). Although such a system is capable of indicating the general presence of liquid in the tank, such an indication fails to provide accurate information regarding the exact quantity of liquid contained in the tank, especially in tanks having a non-linear volume profile. In other words, these methods are incapable of accurately determining the amount of liquid contained in a storage tank where the quantity of liquid contained therein varies in a non-linear relationship relative to liquid level.

In order to compensate for tanks having a non-linear volume profile (tanks having contoured interior walls or irregular shapes), a computer chip is commonly employed to convert the liquid level to a numeric value corresponding to the volume of liquid contained in the tank. However, such methods requiring the use of a computer chip to convert a linear measurement to a volumetric unit of measurement are typically complex, and as a result are expensive and subject to increased maintenance costs. Alternative methods for determining the quantity of liquid in a storage tank are disclosed in U.S. Pat. No. 4,724,705 to Harris, U.S. Pat. No. 4,215,574 to Godeaux, and U.S. Pat. No. 4,192,187 to Kennedy et al. However, these alternative methods utilize devices which are also relatively complex, expensive, and difficult to maintain.

The present invention attempts to remedy the inconveniences and drawbacks of prior gauge devices, and provides an apparatus and method for accurately determining the amount of liquid contained in a storage tank having an interior defining a predetermined relationship between liquid level and volumetric content.

SUMMARY OF THE INVENTION

The present invention relates generally to an apparatus for accurately determining the volumetric content of liquid contained in a storage tank. While the nature of the invention covered herein is to be determined with reference to the claims appended hereto, certain forms of the invention that are characteristic of the preferred embodiment are described briefly as follows.

Apparatus and method are provided for determining the amount of liquid contained in a storage tank having an interior defining a predetermined relationship between liquid level and volumetric content. According to a typical embodiment, the apparatus includes an elongate member disposed in the tank in a substantially vertical orientation and having a longitudinal edge defining a varying profile corresponding to the predetermined relationship between liquid level and volumetric content. A buoyant member is operably connected to the elongate member to cause the elongate member to be vertically displaced in response to the vertical displacement of the buoyant member resulting from a corresponding change in liquid level. A measuring device is provided for measuring the distance between the longitudinal edge and a reference plane aligned substantially parallel to the longitudinal axis of the elongate member. The measured distance is directly proportional to the volumetric content of the liquid contained in the tank.

In a further aspect of the invention, also provided is a tube having a side wall and a bottom wall. The buoyant member is slidable vertically along the exterior surface of the tube, while the elongate member is slidable vertically along the inner region of the tube. The buoyant member and the elongate member have interacting features which cause the elongate member to move in correspondence with the buoyant member generally along the longitudinal axis.

It is an object of the present invention to provide an apparatus and method for accurately determining the amount of liquid contained in a storage tank. Additional objects, features and advantages of the present invention will become apparent to those skilled in the art upon consideration of the following detailed description of a preferred embodiment exemplifying the best mode of carrying out the invention as presently perceived.

BRIEF DESCRIPTION OF THE DRAWINGS

FIG. 4b is a fragmentary side elevation view of the T-shaped extrusion shown in FIG. 4a taken along line 4b—4b of FIG. 4a.

DESCRIPTION OF THE PREFERRED EMBODIMENTS

Figure 1:
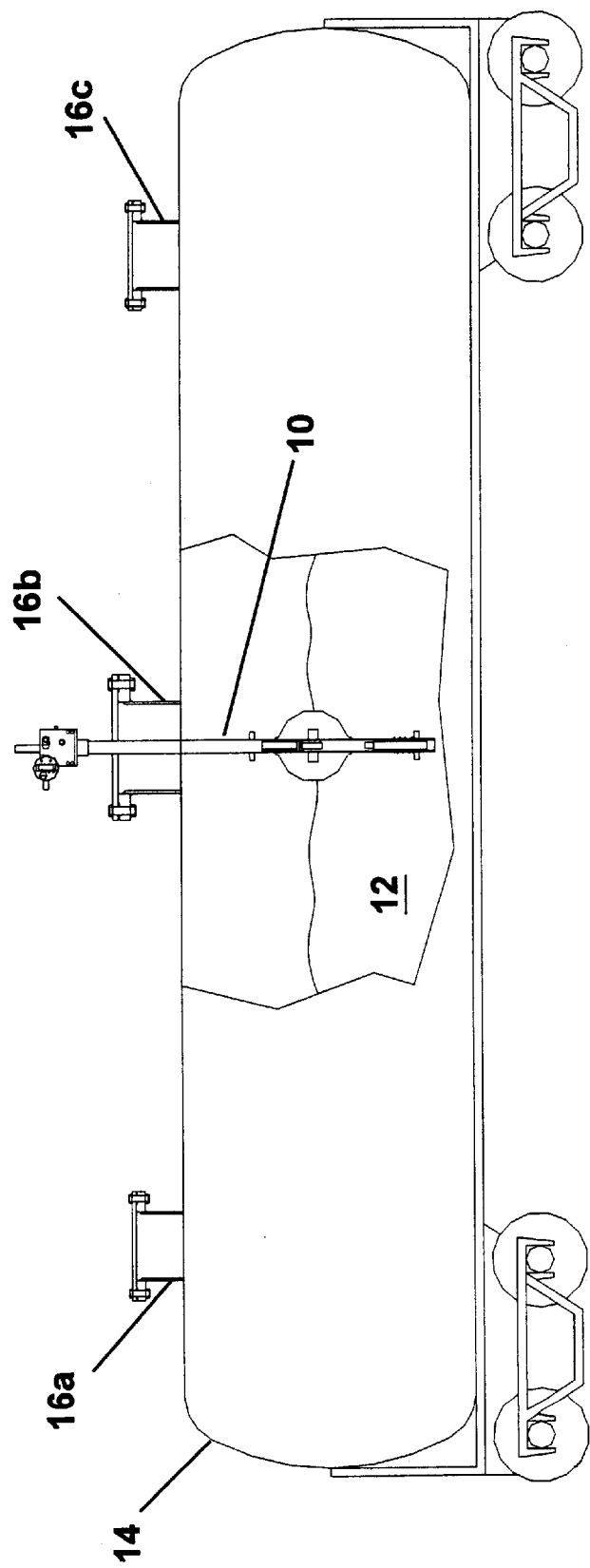
FIG. 1 is a side elevation view of a gauge according to one embodiment of the present invention, as used in conjunction with a railroad tank car.

For the purposes of promoting an understanding of the principles of the invention, reference will now be made to the embodiment illustrated in the drawings and specific language will be used to describe the same. It will nevertheless be understood that no limitation of the scope of the invention is intended, any alterations and further modifications in the illustrated device, and any further applications of the principles of the invention as illustrated therein being contemplated as would normally occur to one skilled in the art to which the invention relates.

Referring now to the drawings in detail, FIG. 1 shows a measuring apparatus or gauge 10 for determining the amount of liquid 12 contained in a railroad tank car 14. Tank car 14 has a substantially cylindrical configuration and, if the liquid 12 contained therein is flammable or gives off noxious or poisonous vapors, the interior of the tank car 14 must be completely sealed off from the outer environment. However, access to the interior of the tank can be made through a series of access hatches 16a–c. Typically, each access hatch communicates with a separate tank section within the tank car. To measure the amount of liquid 12 contained in the center tank section, gauge 10 is shown operably attached to access hatch 16b. Although not shown in FIG. 1, a pair of gauges 10 could similarly be used to respectively measure the amount of liquid contained in the outer tank sections.

It should be understood that the exact configuration of tank car 14 may vary. For instance, it is well known that tank cars can be configured to take on a variety of hatch or port arrangements. The tank sections can also be fabricated in a wide variety of sizes and configurations, and need not necessarily be cylindrical. For example, some railroad tank cars may include sloped side walls or may take on an irregular shape. In particular, a fuel tank for a locomotive engine is typically suspended beneath the locomotive frame and extends the full width of the locomotive. The fuel tank commonly has a non-rectangular shape in which the side walls curve downwardly and inwardly, and may take on an irregular shape to accommodate for external locomotive equipment, such as air tanks and the like. Although gauge 10 is depicted in FIG. 1 as a means for measuring the volume of liquid contained in a railroad tank car, it should nonetheless be understood that gauge 10 can also be used in conjunction with any type of liquid storage tank defining a predetermined relationship between liquid level and volumetric content.

Figure 2:
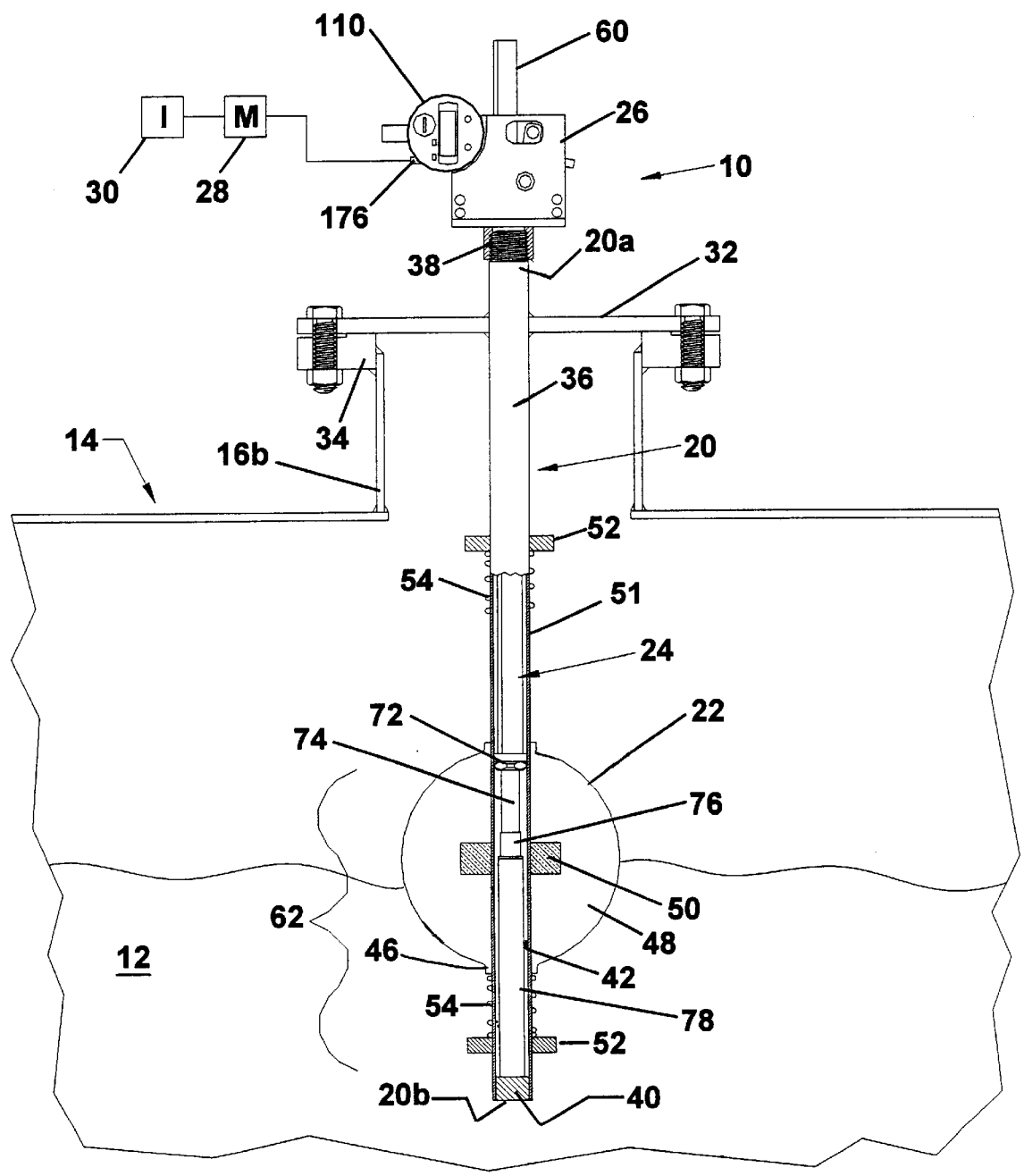
FIG. 2 is an enlarged fragmentary sectional view of the gauge depicted in FIG. 1, as installed on a portion of the railroad tank car.

Referring now to FIG. 2, shown therein is an enlarged, fragmentary sectional view of gauge 10, as installed on tank car 14. For clarity, and in order to best utilize the space available for illustration purposes, certain portions of gauge 10 are not necessarily drawn to scale. This is most evident in the case of tube 20 and elongate member 60, which are illustrated much shorter than would be the case in an actual installation. Gauge 10 generally includes an outer tube 20, a buoyant member or float 22, a rod assembly 24, a measuring device 26, a signal multiplier 28, and an indicator display 30.

Gauge 10 is installed on tank car 14 by operably attaching tube 20, preferably by welding, to cover plate 32 of access hatch 16b in a substantially vertical orientation, with a portion of tube 20 protruding from the top of cover plate 32. The remainder of tube 20 is disposed inside the tank. The interface between tube 20 and cover plate 32 is hermetically sealed. Cover plate 32 is typically disk-shaped and is bolted and sealed to hatch flange 34, thus maintaining isolation between the tank interior and the outer environment. In this manner of installation, gauge 10 can only be removed from tank car 14 by first removing cover plate 32. However, it should be understood that gauge 10 could alternatively be attached to tank car 14 via any number of installation techniques, such as, for example, by removably coupling tube 20 to cover plate 32.

Tube 20 has a side wall 36 defining a generally circular cross section and is preferably composed of a corrosion resistant, non-magnetic material, such as 300 series stainless steel, in order to withstand the corrosive effect of certain liquids which may be stored in the tank. While tube 20 could possibly be composed of a ferrous material, the material's thickness and magnetic properties must not be such as to substantially interfere with the magnetic forces to be described in greater detail below. Side wall 36 has an upper end 20a disposed external to tank car 14 proximate cover plate 32, and a lower end 20b preferably disposed proximate the bottom of the tank in order to maximize the measurement range of gauge 10. Depending upon the anticipated depth of the tank and the desired range of measurement, the overall length of tube 20 may be varied to meet the requirements of the particular storage tank application.

Upper end 20a of tube 20 is open and the portion of side wall 36 adjacent upper end 20a includes external threads 38 for threadedly receiving measuring device 26, or a threaded end cap (not shown) if measuring device 26 is removed and gauge 10 is not being used. Lower end 20b of tube 20 is closed via a bottom plate 40. Bottom plate 40 is preferably permanently welded to lower end 20b, but could alternatively take the form of a threaded end cap. Thus, tube 20 has an inner region 42 which is completely isolated from the interior of the tank so as to prevent liquid or vapor from entering tube 20 and possibly exiting at open top end 20a. By isolating the inner region 42 from the tank interior, the tank car can maintain the sealed containment of liquid 12 and any vapors emanating therefrom.

Float 22 is torus-shaped and includes a hollow, generally spherical shell 44 and a sleeve 46 disposed through the center of shell 44 and hermetically attached thereto. Float 22 thus defines an air chamber 48, isolated from the liquid 12 so as to provide buoyancy. Shell 44 and sleeve 46 are preferably made of a corrosion-resistant, non-magnetic material. Float 22 also includes a ring-shaped magnet 50 disposed within air chamber 48, encircling a portion of sleeve 46 and operably attached thereto at approximately the center of sleeve 46. Sleeve 46 is sized to slidably receive tube 20 therethrough such that float 22 is slidable vertically along the exterior surface 51 of tube 20 in response to a change in the level of liquid 12. Because magnet 50 is directly attached to sleeve 46, as float 22 rises or falls in response to a change in liquid level, magnet 50 will also move in correspondence with a change in liquid level.

A ring-shaped collar 52 is securely attached to tube 20 near lower end 20b. A cushion spring 54 is disposed about tube 20 and positioned between collar 52 and the bottom of float 22. Collar 52 and spring 54 cooperate to prevent float 22 from sliding off of tube 20 during the initial installation of gauge 10. Collar 52 and spring 54 also prevent float 22 from sliding off tube 20 during the emptying of liquid 12 from the tank, or if the liquid level falls somewhat below lower end 20b of tube 20. A similar collar/spring combination may be installed on tube 20 at a desired height above float 22 to prevent damage to float 22 in the unlikely event of the overfilling of the tank car 14. It should be understood, however, that the inclusion of collar 52 and spring 54 are merely to protect float 22 from possible damage, and are not essential to the proper operation of gauge 10.

Rod assembly 24 is disposed within the inner region 42 of tube 20, and generally includes an elongate member 60 and a lower assembly 62. Rod assembly 24 is slidable vertically along the length of tube 20. As will be discussed in further detail below, float 22 and rod assembly 24 have interacting features which cause rod assembly 24 to move in correspondence with the vertical displacement of float 22 resulting from a change in the level of liquid 12, thus providing simultaneous movement and positioning of rod assembly 24 and float 22.

Figure 3:
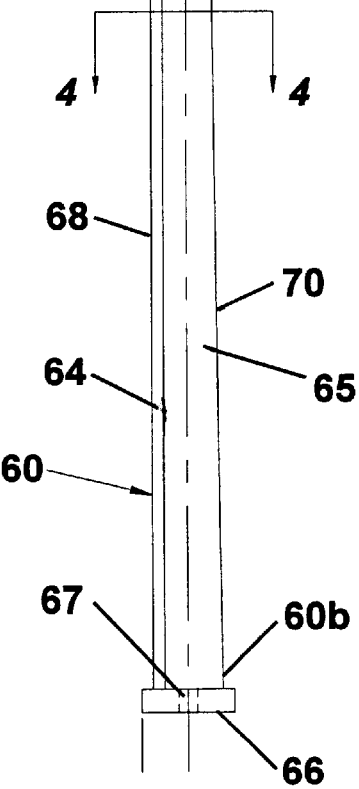
FIG. 3 is a side elevation view of an elongate T-shaped extrusion for use with the gauge depicted in FIGS. 1 and 2.
Figure 4A:
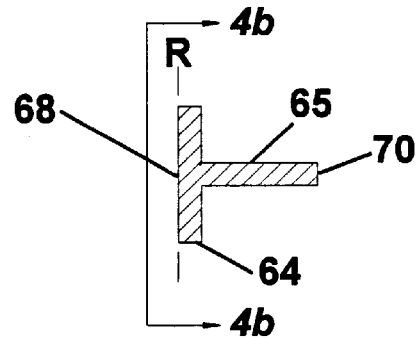
FIG. 4a is a cross-sectional view of the elongate T-shaped extrusion shown in FIG. 3, taken along line 4a—4a of FIG. 3.
Figure 4B:
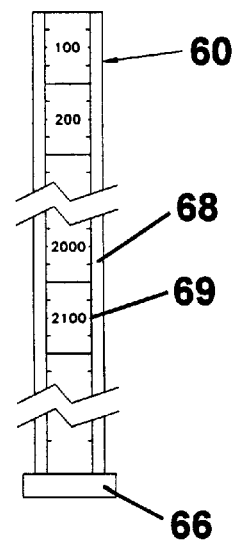

Referring now to FIGS. 3, 4a and 4b, shown therein are various structural details of elongate member 60. Elongate member 60 has a longitudinal axis L extending between an upper end 60a and a lower end 60b and is preferably made of a lightweight, corrosion resistant material, such as, for example, aluminum. The length of elongate member 60 is approximately equal to the length of tube 20, although a somewhat greater or lesser length could alternatively be utilized. As most clearly shown in FIG. 4a, elongate member 60 is generally T-shaped, having a base portion 64 and a shank portion 65 extending therefrom in a generally perpendicular direction. Preferably, elongate member 60 is an integral, one-piece extrusion. However, elongate member 60 may be machined from a solid piece of stock, or base portion 64 and shank portion 65 could alternatively be fabricated separately and operably connected to form elongate member 60. Elongate member 60 also includes a bottom plate 66 attached to bottom end 60b, preferably by welding. Bottom plate 66 is generally circular and has a threaded aperture 67 extending therethrough.

Base portion 64 has a generally flat surface 68 facing opposite shank portion 65. Flat surface 68 defines a reference plane R aligned substantially parallel with longitudinal axis L. As shown in FIG. 4b, imprinted or applied to flat surface 68, are indicia 69 signifying the amount of liquid 12 contained in tank car 14. The indicia 69 sequentially appear at the top of measuring device 26 as the rod assembly 24 is vertically displaced within tube 20. Preferably, the indicia 69 constitute horizontal lines accompanied by numeric values corresponding to liquid volume or depth. Although the indicia 69 are not necessary for the proper functioning of gauge 10 they provide an alternative method of determining the content of liquid 12 contained in the tank car 14. Liquid volume or depth may thus be readily determined by a tankerman by directly observing which indicia marking on flat surface 68 is aligned with a predetermined reference plane, preferably the top surface of measuring device 26.

Shank portion 65 has a longitudinal edge 70 facing generally opposite flat surface 68. As most clearly shown in FIG. 3, longitudinal edge 70 defines a varying profile, tapering inwardly from bottom end 60b to top end 60a. It should be understood, however, that longitudinal edge 70 could alternatively taper outwardly from bottom end 60b to top end 60a. Importantly, the profile of longitudinal edge 70 directly corresponds to the predetermined relationship between the volumetric content of the liquid 12 contained in the tank car 14 at varying liquid levels. In other words, the profile of longitudinal edge 70 varies along the length of elongate member 60 and is representative of the contour or slope of the interior walls of tank car 14. In one embodiment of the present invention, the profile of longitudinal edge 70 is a machined taper, having a precision of approximately 0.0001".

As will become further apparent below, the horizontal distance between reference plane R and longitudinal edge 70 at any point along longitudinal axis L is representative of the volume of liquid 12 in the tank car 14 at the corresponding liquid level. It should be understood that portions of longitudinal edge 70 may be angled or curved. For example, if a section of the tank's side walls are oriented vertically (i.e., not sloped or curved), the resulting relationship between liquid level and liquid volume will be linear, and the corresponding profile of longitudinal edge 70 will be angled (i.e., a straight slope). In another example, if a section of the tank's side walls are angled outwardly, as in a V-trough, or curved outwardly, as in the lower half of a cylindrical tank positioned on its side, the resulting relationship between liquid level and liquid volume will be non-linear. In this instance, the corresponding profile of longitudinal edge 70 will be curved, and more precisely will take on a configuration in which the tangential slope of the curve will decrease in response to a corresponding increase in liquid level. On the other hand, if a section of the tank's side walls are angled or curved inwardly, the corresponding profile of longitudinal edge 70 will take on a configuration in which the tangential slope of the curve will increase in response to a corresponding increase in liquid level. It should also be understood to one of ordinary skill in the art that the profile of longitudinal edge 70 may take on a configuration constituting a complex curve having varying degrees of magnitude depending upon the extent of irregularity of the tank's side walls.

An important advantage of the above-described tapered profile is that longitudinal edge 70 can be fabricated to represent a linear and/or non-linear function indicative of the depth of liquid 12 at a selected measurement location within tank car 14. The tapered profile can be custom machined to represent virtually any liquid storage tank having a known "volume profile" in which the volumetric content of liquid in the tank varies proportionally with respect to liquid level. One method of determining the volume profile of the tank is to meter the introduction of liquid into the tank and produce a data table indicating the volume of liquid contained in the tank at various liquid levels. For example, a liquid volume measurement (measured via a metering device, such as a flow meter) could be incrementally taken at 0.25" liquid level increments. The resulting data may then be used to machine the tapered profile of longitudinal edge 70 to match the volume profile of the tank. Alternatively, the configuration of the interior walls of the tank could be converted into a mathematical function corresponding to the volumetric profile of the tank, which may in turn be used to machine the tapered profile.

Figure 5:
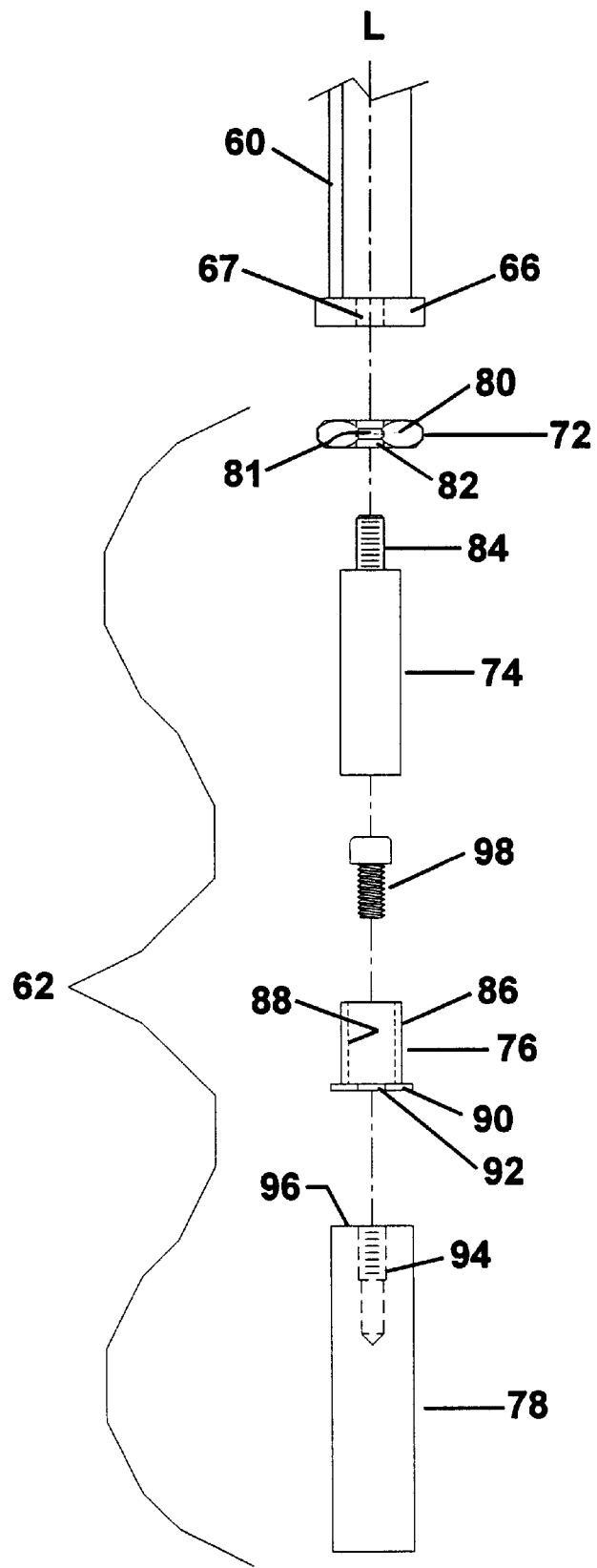
FIG. 5 is an exploded view of an assembly attached to the lower end of the elongate T-shaped extrusion depicted in FIG. 4
Figure 6:
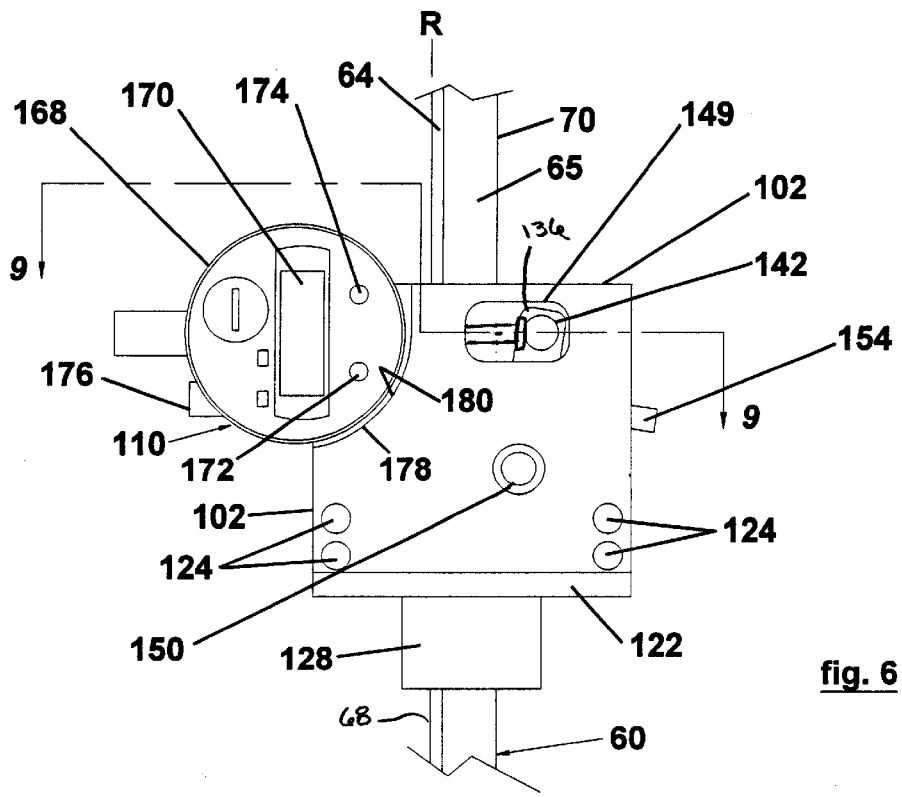
FIG. 6 is an enlarged side elevation view of a measuring device for use with the gauge depicted in FIGS. 1 and 2.

Referring now to FIG. 5, shown therein is an exploded view of lower assembly 62 of rod assembly 24. Lower assembly 62 is operably connected to elongate member 60 and generally includes a disk 72, a rod shaped magnet 74, a rubber boot 76, and a spacer 78.

Disk 72 is generally circular and has a diameter slightly less than the inner diameter of tube 20 so that disk 72 may slide freely therein. In order to promote sliding and to avoid potential binding, disk 72 is preferably composed of a material having a relatively low coefficient of friction, such as, for example, Teflon™. Additionally, a plurality of flats 80 is preferably machined around the perimeter of disk 72 in an effort to lessen the possibility of binding as disk 72 is transferred along the interior surface of tube 20. Preferably, but not necessarily, four flats 80 are uniformly machined around the perimeter of disk 72 so as to provide four independent areas of contact 81 between disk 72 and the interior surface of tube 20. In this manner, any dirt or foreign substances which might accumulate within inner region 42 of tube 20 will not become wedged between disk 72 and the interior surface of tube 20, but will pass by disk 72 along flat 80, thus avoiding, or at the very least minimizing, the possibility of binding. Disk 72 also includes an opening 82 extending therethrough and alignable with threaded aperture 67 in bottom plate 66.

The rod-shaped magnet 74 has a diameter somewhat smaller than the diameter of disk 72 and has a threaded shank 84 extending upwardly therefrom. Disk 72 and magnet 74 are operably attached to bottom plate 66 by passing threaded shank 84 through opening 82 in disc 72 and threadedly engaging shank 84 into threaded aperture 67 in plate 66. Other methods of attaching disc 72 and magnet 74 to bottom plate 66 are also contemplated as would occur to one of ordinary skill in the art. Because disc 72 is securely attached to elongate member 60, disc 72 will guide elongate member 60 within tube 20 generally along longitudinal axis L.

Rubber boot 76 has a side wall 86 defining an outer diameter somewhat smaller than the diameter of disk 72, and an interior region 88 defining an inner diameter slightly smaller than the outer diameter of magnet 74. Boot 76 also includes a bottom wall 90 defining an opening 92 therethrough. Spacer 78 is preferably a rod having a diameter somewhat smaller than the diameter of disk 72, and defines a threaded aperture 94 extending downwardly from top surface 96. Spacer rod 78 is preferably composed of a lightweight, corrosion resistant material, such as, for example, a plastic material. Boot 76 is connected to spacer rod 78 by aligning opening 92 with threaded aperture 94 and passing a bolt 98 through opening 92 and threadedly engaging bolt 98 into threaded aperture 94. Finally, boot 76 and spacer rod 78 are connected to magnet 74 by inserting magnet 74 into the interior region 88 of boot 76. The elasticity of boot 75 retains magnet 74 within interior region 88.

When tank car 14 is empty, or when the liquid level in the tank is at or below the level depicted in FIG. 2, float 22 will be at rest on cushion spring 54 in its lowermost position relative to tube 20. In this position, spacer rod 78 will rest against bottom plate 40 of tube 20. Rod 78 is of such a length so that when float 22 and spacer rod 78 are in their respective at-rest positions, the rod-shaped magnet 74 will be positioned slightly above the ring-shaped magnet 50. Thus, spacer rod 78 serves to limit the vertical position of magnet 74 relative to magnet 50 and ensures that the magnetic field generated by magnet 74 will never fall below the magnetic field generated by magnet 50, for if this occurred, rod assembly 24 would not move in correspondence with the vertical displacement of float 22. As a result, gauge 10 would likely provide an erroneous indication of the amount of liquid 12 contained within tank car 14.

The magnetic fields generated by magnet 50 and magnet 74 are of like polarity, and therefore have a tendency to repel one another. The repulsion exerted by the concentric magnetic fields of magnets 50 and 74 exert an upward force on rod assembly 24 when the magnetic field generated by magnet 50 is at or just below the magnetic field generated by magnet 74. As liquid 12 is added to tank car 14, rod assembly 24 will begin to rise in response to the vertical displacement of float 22. Because of the sliding engagement between disk 72 and tube 20, disk 72 will guide rod assembly 24, and rod assembly 24 will be lineally displaced within inner region 42 generally along longitudinal axis L. It should be understood that the magnetic coupling feature described immediately above is also applicable when the level of liquid 12 in tank car 14 begins to fall. As float 22 is downwardly displaced in response to a decrease in liquid level, rod assembly 24 will correspondingly move downwardly.

Thus, it has been shown that the magnetic coupling of float 22 to rod assembly 24 causes simultaneous movement and positioning therebetween. Because of this magnetic interaction, float 22 and rod assembly 24 will remain magnetically locked in a fixed, radially spaced relationship and in a fixed axial relationship so that they will move precisely in synchronism generally along longitudinal axis L.

Referring now to FIGS. 6–9, shown therein are various structural details of measuring device 26. Measuring device 26 generally includes a housing 102, a stationary bearing assembly 104, a moveable bearing assembly 106, a biasing member 108, and an indicator gauge 10. As will be described in greater detail below, measuring device 26 is configured to measure the precise change in distance between reference plane R and longitudinal edge 70 as elongate member 60 is vertically displaced generally along longitudinal axis L. As described above, this distance is directly proportional to the volumetric content of liquid 12 contained in the tank at a corresponding liquid level.

Housing 102 includes a front plate 114, a rear plate 116, a side plate 118, a bottom plate 120, and a threaded mounting plate 122. Housing 102 is preferably made of a lightweight, corrosion resistant material, such as, for example, aluminum. Front plate 114 and rear plate 116 are attached to bottom plate 120 by way of a plurality of bolts 124. Similarly, threaded mounting plate 122 is attached to bottom plate 120 by way of a plurality of bolts 126. Side plate 118 is disposed between front plate 114 and rear plate 116, and is securely held in position by way of a plurality of pins (not shown). Although housing 102 is shown as being comprised of a series of interconnected plates, it should be understood that housing 102, or portions thereof, could alternatively be fabricated from a monolithic block of aluminum.

Mounting plate 122 includes an internally threaded sleeve 128 which threadedly engages external threads 38 located adjacent top end 20a of tube 20. Thus, measuring device 26 is securely attached to tube 20 by threading sleeve 28 onto external threads 38. Bottom plate 120 includes a T-shaped opening 130 sized slightly larger than the maximum cross sectional area of elongate member 60. While elongate member 60 is freely slidable through T-shaped opening 30, because bottom plate 66 has a circular shape, elongate member 60 cannot be completely removed from tube 20 without first removing housing 102 from tube 20.

Figure 7:
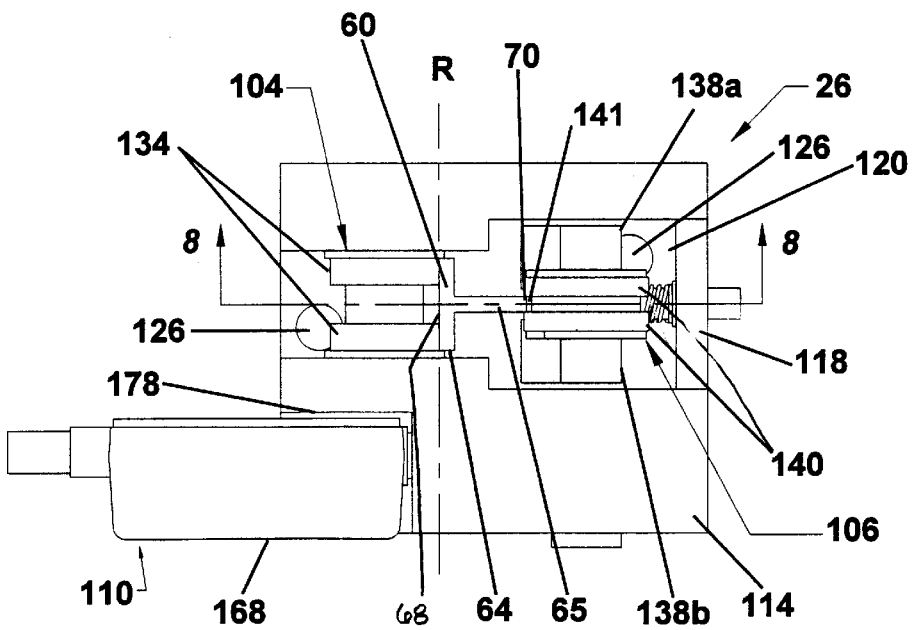
FIG. 7 is a top plan view of the measuring device shown in FIG. 6.
Figure 8:
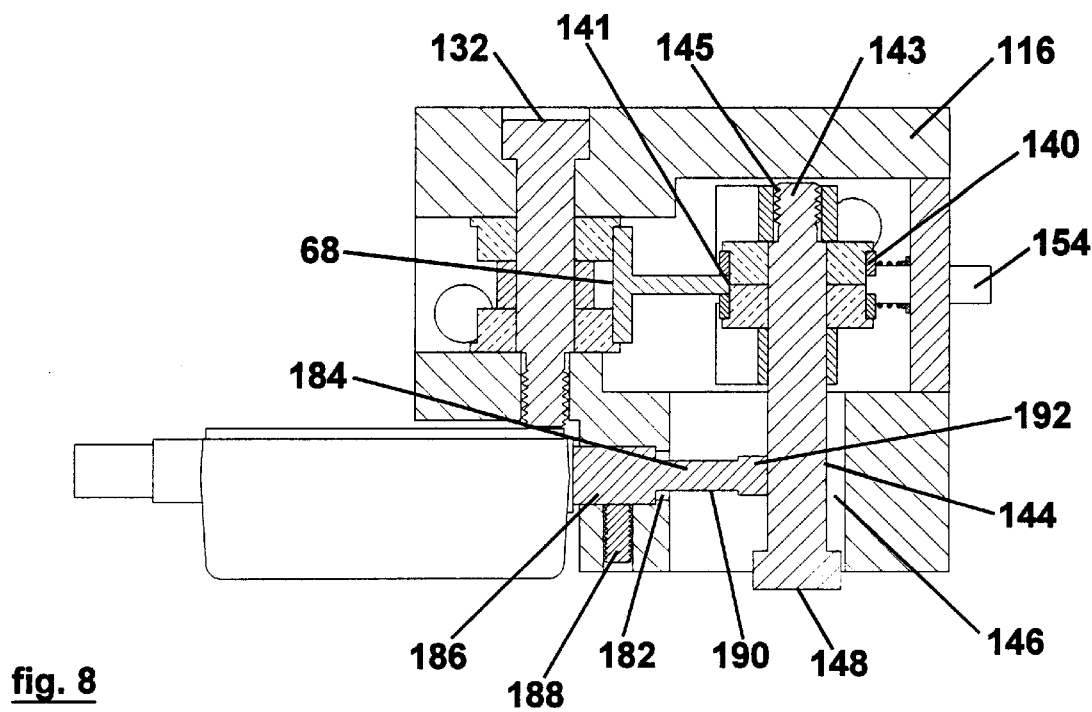
FIG. 8 is a side cross-sectional view of the measuring device shown in FIG. 7, taken along line 8—8 of FIG. 7.
Figure 9:
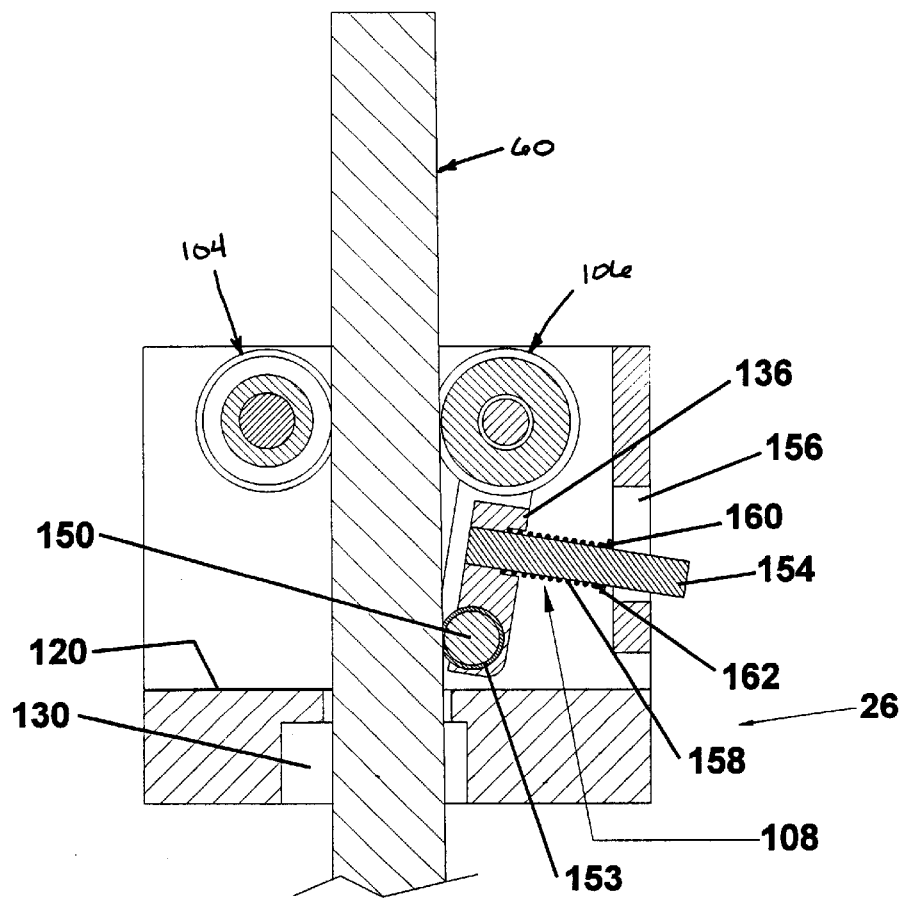
FIG. 9 is a top cross-sectional view of the measuring device shown in FIG. 6, taken along line 9—9 of FIG. 6.

Stationary bearing assembly 104 is disposed between front plate 114 and rear plate 116, and is securely held in position by way of a mounting bolt 132 extending between front and rear plates 114, 116. Bearing assembly 104 includes a pair of bearing wheels 134 (outer bearing races) which are freely rotatable about mounting bolt 132. As shown in FIG. 7, reference plane R, defined by flat surface 68 of elongate member 60, is aligned in a vertical tangential relationship to bearing wheels 134.

Movable bearing assembly 106 includes a U-shaped pivot plate 136 having upwardly extending fingers 138a, 138b. A pair of bearing wheels 140 (outer bearing races) are disposed between fingers 138a, 138b, and are securely held in position by way of a mounting bolt 142. Mounting bolt 142 includes a threaded shank portion 143 and a smooth shank portion 144. Threaded shank portion 143 is engaged within a threaded opening 145 in finger 138a. Smooth shank portion 144 extends through bearing wheels 140 and through opening 146 in finger 138b. Smooth shank portion 144 and driving head 148 pass through an elongate slot 149 extending through front plate 114. Pivot plate 136 is pivotally attached to housing 102 by way of a pivot bolt 150, which extends through front plate 114, through an opening (not shown) in pivot plate 136, and engages a threaded aperture (not shown) in rear plate 116. A brass sleeve 153 is disposed about a portion of the shank of pivot bolt 150 to prevent the galling of the inside surface of through opening 151.

Biasing member 108 includes an actuating lever 154, a biasing spring 158, a steel washer 160, and a Teflon™ washer 162. Actuating lever 154 is operably connected to pivot plate 136 and extends through a vertical elongate slot 156 disposed in side plate 118. Biasing spring 158 is disposed about actuating lever 154 and positioned between pivot plate 136 and side plate 118. Steel washer 160 and Teflon™ washer 162 are also disposed about actuating lever 154 between biasing spring 158 and side plate 118. Biasing spring 158 bears against steel washer 160, which in turn bears against Teflon™ washer 162. Teflon™ washer 162 slides against the inside surface of side plate 118 along the length of elongate slot 156 as plate 136 is pivoted about pivot bolt 150. One purpose of actuating lever 154 is to provide the capability of manually pivoting pivot plate 136 about pivot bolt 150, which may be necessary when initially inserting elongate member 160 between bearing assembly 104 and bearing assembly 106.

As most clearly shown in FIG. 7, elongate member 60 is disposed between stationary bearing assembly 104 and movable bearing assembly 106 such that flat surface 68 of base 64 abuts against bearing wheels 134, and longitudinal edge 70 of shank 65 abuts against bearing wheels 140. More particularly, longitudinal edge 70 is disposed within U-shaped groove 141 formed between bearing wheels 140. As elongate member 60 is vertically displaced along longitudinal axis L, the varying profile of longitudinal edge 70 will cause movable bearing assembly 106 to pivot about pivot bolt 150. As a result, mounting bolt 142, and more specifically, smooth shank portion 144, will be horizontally displaced along the length of elongate slot 149. Biasing spring 158 serves to ensure that elongate member 60 remains in bearing contact with stationary bearing assembly 104 and movable bearing assembly 106. Thus, as elongate member 60 is vertically displaced generally along longitudinal axis L, the resulting variation in the horizontal distance between flat surface 68 and longitudinal edge 70 will cause mounting bolt 142 to be correspondingly horizontally displaced within elongate slot 149.

Indicator gauge 110 is configured to measure the horizontal displacement of mounting bolt 142 within elongate slot 149. Indicator gauge 110 includes a dial portion 168 which includes a digital display window 170, an origin button 172 for "zeroing" indicator gauge 110, an on/off button 174, and an RS232 output port 176 for auxiliary output of the digital measurement signal generated by indicator gauge 110. Indicator gauge 110 also includes a battery power supply (not shown) to power the digital display 170 and the RS232 output port 176. Dial portion 168 is mounted within a recessed area 178 defined in front plate 114. Recessed area 178 has an arcuate surface 180 which is complementary to the circular shape of dial portion 168.

An opening 182 is defined through front plate 114, extending between arcuate surface 180 and elongate slot 149. Indicator gauge 110 has a stem portion 184 which extends through opening 182. Stem portion 184 includes a shoulder 186 having an outer diameter slightly smaller than the inner diameter of opening 182. Indicator gauge 110 is held in position relative to housing 102 by way of a set screw 188. Set screw 188 is threaded into threaded opening 189 in front plate 114 until it securely engages shoulder 186, thus locking indicator gauge 110 into position relative to housing 102. It should be understood, however, that other methods for attaching indicator gauge 110 to housing 102 are also contemplated as would occur to one of ordinary skill in the art. For example, indicator gauge 110 could be secured to housing 102 by way of a bayonet snap arrangement.

Stem portion 184 also includes a spring-loaded plunger 190 and an enlarged head portion 192 extending from plunger 190. Enlarged head portion 192 bears against smooth shank portion 144 of mounting bolt 142. Because plunger 190 is spring-loaded, enlarged head portion 192 will always remain in direct contact with smooth shank portion 144. Indicator gauge 110 is thereby capable of accurately measuring the precise horizontal displacement of mounting bolt 142 within elongate slot 149. The measurement range of indicator gauge 110 is approximately one-half inch. However, it should be understood that a wider measurement range is also contemplated. This could be accomplished by simply selecting an indicator gauge capable of measuring a wider range of lineal displacement and correspondingly increasing the overall length of elongate slot 149. Indicator gauge 110 has a precision of 0.0001 inches; however, indicator gauges having a greater or lesser degree of precision may alternatively be used. An example of a suitable indicator gauge 110 is manufactured by Mitutoyo under Part No. 543-683B. However, other suitable indicator gauges capable of accurately measuring lineal displacement are also contemplated as would occur to one of ordinary skill in the art.

As described above, measuring device 26 is configured to measure the change in horizontal distance between flat surface 68 and longitudinal edge 70 as elongate member 60 is vertically displaced along longitudinal axis L in response to a corresponding change in the level of liquid 12. This horizontal distance is directly proportional to the momentary volumetric content of liquid contained in tank car 14. Although this horizontal distance may be read directly from digital display window 170, and taken as an indication of liquid volume, preferably, a conventional signal multiplier 28 and remote indicator display 30 are utilized to give a remote indication of liquid volume in a pre-determined volumetric unit of measurement.

As shown in FIG. 2, signal multiplier 28 is electrically coupled to the indicator gauge 110 via the RS232 output port 176. The linear measurement signal generated by indicator gauge 10 is transmitted to signal multiplier 28 and proportionally converted to a value directly corresponding to a predetermined volumetric unit, such as, for example, gallons. The converted signal is then transmitted to indicator display 30 for the remote display of the liquid volume in the chosen unit of measurement. The display indicator 30 can be mounted on a control rack or console for remote monitoring during the loading/unloading of tank car 14. Alternatively, if gauge 10 is used to monitor the quantity of fuel contained in a fuel tank, such as on a locomotive engine, display indicator 30 may be mounted in a location on the locomotive where it may be easily and conveniently monitored by the operator. An example of a usable signal multiplier 28 and display 30 combination manufactured by Quality Measurement Systems, in New York, under Model No. Genesis QA2500. However, it should be understood that other types or models of signal multipliers or indicator displays are also contemplated as would occur to one of ordinary skill in the art.

By way of example, and not in any way limiting the scope of the present invention, if a liquid storage tank has a capacity of 5,000 gallons, and elongate member 60 is configured so that the profile of longitudinal edge 70 has a measurable horizontal variation along its length of one-half inch, a straight signal multiplication of 10,000×would provide a displayable volumetric range of 0–5,000 gallons. It should be appreciated that gauge 10 does not require a computer chip or related software to compute the volumetric content of liquid contained in a tank based on a corresponding liquid level measurement because the "volumetric profile" of the interior of the tank has already been "programmed" onto elongate member 60 via the varying profile of longitudinal edge 70. In other words, the profile of longitudinal edge 70 is calibrated to proportionally reflect the precise volumetric content of liquid contained in the tank at any given liquid depth. Because longitudinal edge 70 is directly proportional to volumetric content, a straight multiplication of the measurement signal generated by indicator gauge 110 is all that is required to provide a display signal directly corresponding to the desired volumetric unit of measurement.

In operation, prior to the filling of an empty tank car 14 with liquid 12, it should preferably be verified that measuring device 26 is "zeroed" to reflect an empty tank condition. This may be accomplished by ensuring that elongate member 60 is in its lowest-most position within tube 20. In this position, the bottom of rod 78 of lower assembly 62 should be resting on bottom plate 40 of tube 20. Indicator gauge 110 may then be reset or "zeroed" by depressing origin button 172. At this point, digital display 170 and indicator display 30 should indicate a zero measurement, signifying that tank car 14 is empty. As liquid 12 is introduced into tank car 14, float 22 will be buoyantly supported by liquid 12 and will begin to rise in response to the increase in liquid level. Elongate member 60 will in turn be vertically displaced within tube 20 in synchronism with the vertical displacement of float 22 due to the magnetic interaction between magnet 50 and magnet 74. At any given liquid depth, measuring device 26 will accurately determine the precise horizontal distance between flat surface 68 and longitudinal edge 70 of elongate member 60. As discussed in detail above, this horizontal distance is directly proportional to the momentary volumetric content of liquid 12 contained in tank car 14.

The momentary volumetric content of liquid 12 can then be acquired by any of the following methods:

1. By observing the indicia markings on flat surface 68 of elongate member 60 relative to a predetermined point of reference;
2. By observing the linear measurement value on digital display 170 of indicator gauge 110 and multiplying this value by a predetermined multiplier; or
3. By observing the volumetric unit of measurement indicated on remote indicator display 30.

When filling is complete, the portion of elongate member 60 protruding from measuring device 26 may be manually depressed into tube 20, whereupon the magnetic coupling between magnet 50 and magnet 74 will be broken and elongate member 60 will fall by gravity to its at-rest position. A cap or lid (not shown) may then be placed over measuring device 26 to protect it from the environment. Additionally, tube 20 may be filled with an antifreeze material (not shown) to prevent the freezing of any moisture which might accumulate on or in tube 20 or measuring device 26. The antifreeze additionally serves to lubricate bearing assemblies 104 and 106 and also promotes the sliding of disc 72 against the interior surface of tube 20.

While the invention has been illustrated and described in detail in the drawings and foregoing description as applied to a railroad tank car, it should be understood that the invention can alternatively be applied in a variety of other mobile situations, such as, for example, tanker trucks and tank barges. The invention could also be used to monitor the amount of fuel in a fuel tank. It should also be understood that the invention can be applied to stationary environments/ sites as well, including any type of liquid storage tank or container, to accurately determine the amount of liquid contained therein. Furthermore, the invention can be used in conjunction with any tank size or tank wall configuration. The disclosure is therefore to be considered as illustrative and not restrictive in character, it being understood that only the preferred embodiment has been shown and described and that all changes and modifications that come within the spirit of the invention are desired to be protected.

What is claimed is:

1. An apparatus for determining the amount of liquid contained in a tank, the tank having an interior defining a predetermined relationship between liquid level and volumetric content, the apparatus comprising:

an elongate member having a longitudinal axis and being at least partially disposed inside the tank, said elongate member having a longitudinal edge defining a profile corresponding to the predetermined relationship between liquid level and volumetric content, the predetermined relationship between liquid level and volumetric content being at least partially defined by a nonlinear function between a variation in liquid level and the resulting change in the volumetric content of liquid contained in the tank;

a buoyant member operably connected to said elongate member to cause said elongate member to be displaced generally along said longitudinal axis in response to displacement of said buoyant member resulting from a corresponding change in liquid level; and a device for measuring a distance between said longitudinal edge and a reference plane aligned substantially parallel to said longitudinal axis when the liquid in the tank is at various levels, said distance being proportional to the volumetric content of liquid in the tank at said various levels.

2. The apparatus of claim 1 and further comprising:

a guide to restrain movement of said elongate member generally along said longitudinal axis.

3. The apparatus of claim 2 and wherein:

said guide includes a tube operably attached to the tank and a disc configured to slide along an interior surface of said tube, said elongate member is positioned in said tube and said disc is operably attached to said elongate member so as to guide said elongate member generally along said longitudinal axis.

4. An apparatus for determining the amount of liquid contained in a tank, the tank having an interior defining a predetermined relationship between liquid level and volumetric content, the apparatus comprising an elongate member having a longitudinal axis and being at least partially disposed inside the tank, said elongate member having a longitudinal edge defining a profile corresponding to said predetermined relationship between liquid level and volumetric content, at least a portion of said profile being non-linear;

a buoyant member operably connected to said elongate member to cause said elongate member to be displaced generally along said longitudinal axis in response to displacement of said buoyant member resulting from a corresponding change in liquid level; and a device for measuring a distance between said longitudinal edge and a reference plane aligned substantially parallel to said longitudinal axis when the liquid in the tank is at various levels, said distance being proportional to the volumetric content of liquid in the tank at sad various levels.

5. The apparatus of claim 4 and wherein:

said elongate member is generally T-shaped and has a base portion and a shank portion extending from said base portion, said shank portion defining said longitudinal edge, said base portion having a generally flat surface facing opposite said shank portion and defining said reference plane.

6. The apparatus of claim 5 and further comprising:

indicia markings on said flat surface appearing sequentially along said longitudinal axis to signify the amount of liquid contained in the tank.

7. An apparatus for determining the amount of liquid contained in a tank, the tank having an interior defining a predetermined relationship between liquid level and volumetric content, the apparatus comprising:

an elongate member having a longitudinal axis and being at least partially disposed inside the tank, said elongate member having a longitudinal edge defining a profile corresponding to said predetermined relationship between liquid level and volumetric content;

a buoyant member operably connected to said elongate member to cause said elongate member to be displaced generally along said longitudinal axis in response to displacement of said buoyant member resulting from a corresponding change in liquid level; and a device for measuring a distance between said longitudinal edge and a reference plane aligned substantially parallel to said longitudinal axis when the liquid in the tank is at various levels, said distance being proportional to the volumetric content of liquid in the tank at said various levels, said measuring device includes a stationary bearing assembly and a movable bearing assembly with said elongate member positioned therebetween, said longitudinal edge engaging said movable bearing assembly in an abutting relationship so as to horizontally displace said movable bearing assembly as said elongate member is displaced generally along said longitudinal axis, said measuring device further includes a linear gauge adapted to measure the horizontal displacement of said movable bearing assembly relative to said reference plane.

8. The apparatus of claim 7 and wherein:

said elongate member has a longitudinal surface facing generally opposite said longitudinal edge and defining said reference plane, said longitudinal surface engaging said stationary bearing assembly in another abutting relationship.

9. The apparatus of claim 7 and wherein:

said measuring device further includes a biasing member adapted to maintain said abutting relationship between said longitudinal edge and said movable bearing assembly.

10. The apparatus of claim 4 and wherein:

said measuring device includes a linear gauge adapted to measure horizontal displacement of said longitudinal edge relative to said reference plane as said elongate member is displaced generally along said longitudinal axis, said linear gauge generating a signal corresponding to said horizontal displacement.

11. The apparatus of claim 10 and further comprising:

a signal multiplier electrically coupled to said linear gauge to proportionally convert said signal to a value directly corresponding to the volumetric content of liquid contained in the tank.

12. The apparatus of claim 11 and further comprising:

an indicator electrically coupled to said signal multiplier for displaying said value at a location remote from the tank.

13. An apparatus for determining the amount of liquid contained in an enclosed tank, the tank having an interior defining a predetermined relationship between liquid level and volumetric content, the apparatus comprising:

a tube at least partially disposed inside the tank, said tube having:

a side wall defining an inner region and an exterior surface, a bottom plate closing a lower end of said tube to prevent admission of the liquid into said inner region, and an open end facing upwardly and protruding from the tank so as to isolate said inner region of said tube from the interior of the tank;

an elongate member having a longitudinal axis and slidable within said inner region of said tube, said elongate member having a longitudinal edge defining a profile corresponding to said predetermined relationship between liquid level and volumetric content, said predetermined relationship between liquid level and volumetric content being at least partially defined by a non-linear function between a variation in liquid level and the resulting change in the volumetric content of liquid contained in the tank;

a float slidable along said exterior surface of said tube;

said elongate member and said float having interacting features which cause said elongate member to be displaced generally along said longitudinal axis in response to displacement of said float resulting from a change in liquid level; and a device for measuring a distance between said longitudinal edge and a reference plane aligned substantially parallel to said longitudinal axis when the liquid in the tank is at a selected level, said distance being proportional to the volumetric content of liquid in the tank at said selected level.

14. The apparatus of claim 13 and wherein:

said measuring device is positioned proximate said open end of said tube exterior to said tank.

15. The apparatus of claim 13 and wherein:

said float and said elongate member are magnetically coupled together for precise simultaneous movement and positioning therebetween.

16. The apparatus of claim 15 and wherein:

said float is generally torus-shaped and includes a ring-shaped magnet operably attached thereto, said float and said ring-shaped magnet encircle a portion of said exterior surface of said tube, said elongate member includes a rod-shaped magnet operably attached to a lower end thereof, said ring-shaped magnet and said rod-shaped magnet interacting to provide said simultaneous movement and positioning.

17. The apparatus of claim 16 and further comprising:

a spacer operably attached to said rod-shaped magnet, said spacer having a length so that when the tank is empty said spacer will rest against said bottom plate of said tube and said rod-shaped magnet will be positioned relative to said ring-shaped magnet so as to maintain magnetic interaction therebetween.

18. The apparatus of claim 13 and further comprising:

a disc operably attached to said elongate member and configured to co-act with an interior surface of said tube so as to guide said elongate member generally along said longitudinal axis.

19. The apparatus of claim 13 and wherein:

the tank is a railroad tank car.

20. A method for determining the amount of liquid contained in a tank, the tank interior defining, a predetermined relationship between liquid level and volumetric content, the method comprising:

providing an elongate member having a longitudinal axis and being at least partially disposed inside the tank, the elongate member having a longitudinal edge defining a profile corresponding to the predetermined relationship between liquid level and volumetric content, the predetermined relationship between liquid level and volumetric content being at least partially defined by a non-linear function between a variation in liquid level and the resulting change in the volumetric content of liquid contained in the tank;

displacing the elongate member generally along the longitudinal axis in response to a corresponding change in liquid level; and measuring a distance between the longitudinal edge and a reference plane aligned substantially parallel to the longitudinal axis when the liquid in the tank is at various levels, the distance being proportional to the volumetric content of liquid in the tank at the various levels.

21. The method of claim 20 and further comprising:

converting the distance to a value directly corresponding to the volumetric content of liquid contained in the tank; and displaying the value at a location remote from the tank.

22. An apparatus for determining the amount of liquid contained in a tank, the tank having interior walls defining a predetermined relationship between liquid level and volumetric content, the apparatus comprising:

an elongate member having a longitudinal axis and being disposed in the tank, said elongate member having a longitudinal edge defining a varying profile corresponding to said predetermined relationship between liquid level and volumetric content, said predetermined relationship between liquid level and volumetric content being at least partially defined by a non-linear function between a variation in liquid level and the resulting change in the volumetric content of liquid contained in the tank;

means for displacing said elongate member generally along said longitudinal axis in response to a corresponding change in liquid level; and means for measuring a distance between said longitudinal edge and a reference plane aligned parallel to said longitudinal axis when the liquid in the tank is at various levels, said distance being proportional to the volumetric content of the liquid in the tank at said various levels.

23. The apparatus of claim 22 and further comprising:

means for guiding said elongate member generally along said longitudinal axis.

24. The apparatus of claim 22 and further comprising:

means electrically coupled to said measuring means for proportionally converting said distance to a unit of measurement directly corresponding to the volumetric content of liquid contained in the tank; and means electrically coupled to said converting means for displaying said unit of measurement at a location remote from the tank.

* * * * *